Aug. 10, 1937.           C. B. ULRICH           2,089,676
           CLASSIFIER AND CONCENTRATOR
           Filed Sept. 24, 1934        2 Sheets-Sheet 1
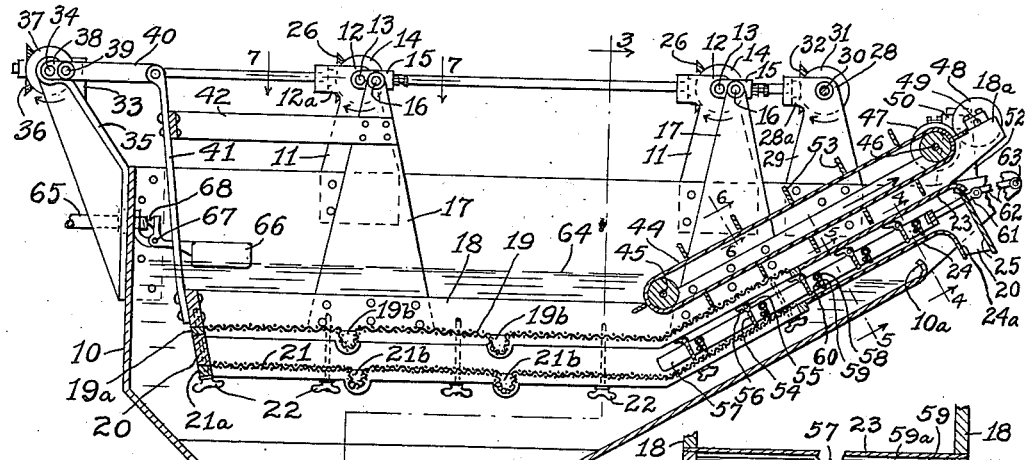
Fig. 1.
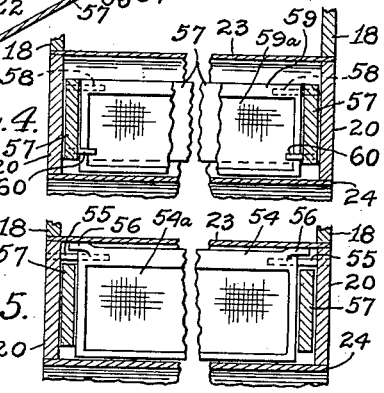
Fig. 4.
Fig. 5.
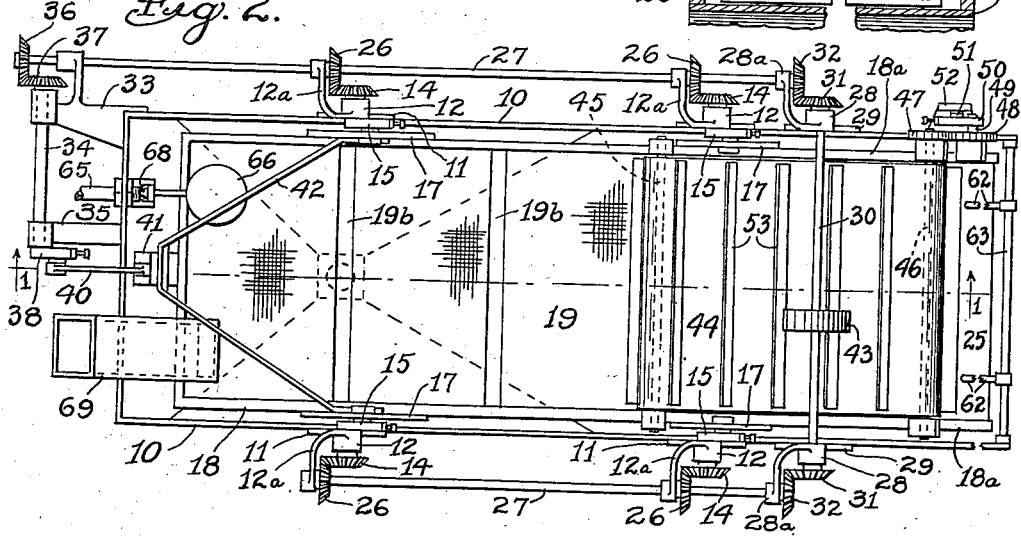
Fig. 2.
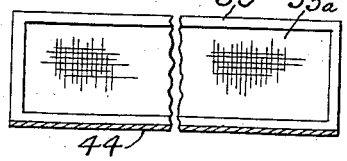
Fig. 6.
INVENTOR
CHARLES B. ULRICH
By Albert C. Bell
ATTORNEY.

Aug. 10, 1937.   C. B. ULRICH   2,089,676
CLASSIFIER AND CONCENTRATOR
Filed Sept. 24, 1934   2 Sheets-Sheet 2
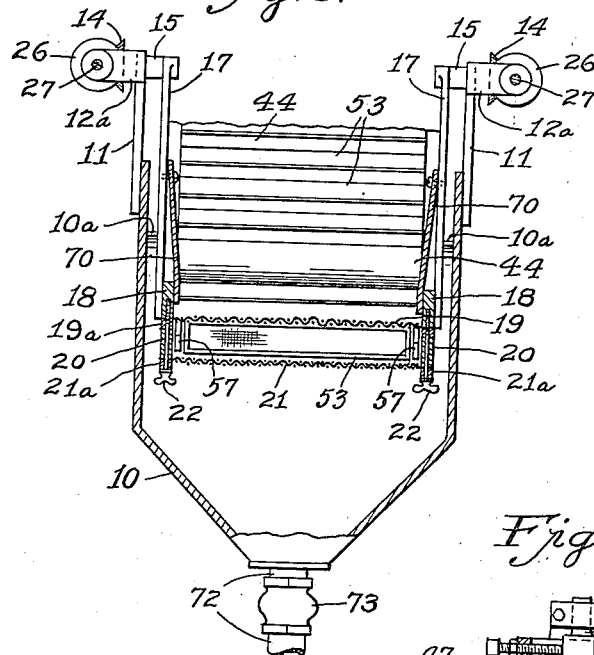
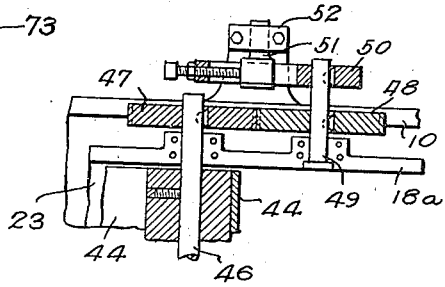
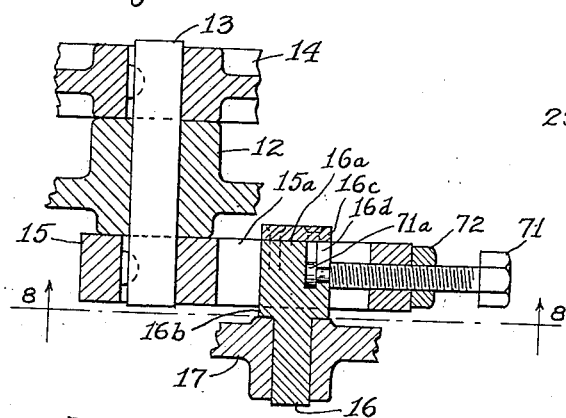
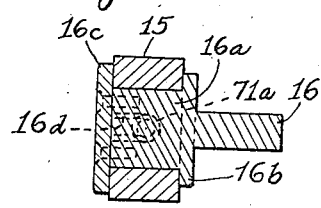
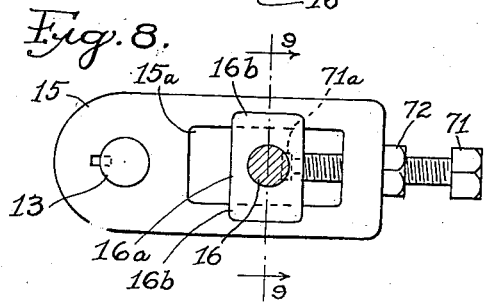
INVENTOR
CHARLES B. ULRICH
BY Albert C. Bell
ATTORNEY Patented Aug. 10, 1937

2,089,676

UNITED STATES PATENT OFFICE 2,089,676

CLASSIFIER AND CONCENTRATOR

Charles B. Ulrich, Jamestown, N. Y., assignor of one-third to A. J. Forschner, Chicago, Ill., and one-third to Ralph H. Burke, Evanston, Ill.

Application September 24, 1934, Serial No. 745,174

5 Claims. (Cl. 209—44)

My invention relates to the treatment of mineral substances or particles under water, by successive steps in such a manner that the substances or particles are for each cycle of treatment, suspended in free and separated condition in the water for a brief interval, permitting the separation by gravity of the heavier particles from the lighter particles and also the separation of the more soluble particles from the less soluble particles, after which the heavier particles and also less soluble particles are engaged by classifying means having cyclic movement in the water, to separate smaller particles from larger particles of the material being treated, and at the same time to move the particles engaged by the classifying means to a new position in the water, continued movement of the classifying means then operating to again leave the said engaged particles in free and suspended condition in the water, successive cycles of such treatment serving to effect alternate engagement of said particles by said classifying means and disengagement of said particles therefrom, at the same time advancing said particles through the water over said classifying means towards the tail end thereof, from which the remaining oversize particles are removed by suitable means.

In carrying out my invention, I preferably support a screen or screens on hangers in a tank of water, and support said hangers on rotating cranks, thus imparting to the hangers and screen or screens, a circular movement, the level of the water in the tank being high enough to completely cover said screen or screens and the mineral material thereon, when said screen or screens are in their uppermost position. The direction of motion of said screen or screens is such that the downward movement thereof, occurs at the time the mineral particles thereon are nearest to the delivery end of the apparatus; the mineral particles are thus left momentarily in suspension in the water, and in separated condition, permitting the heavier particles to settle relatively to the lighter particles, and washing from the less soluble particles, the more soluble material with which they may be associated, for example clay and silt; the water moving upwardly through the screen or screens during their downward movement, cleans the screen or screens and maintains them in effective working condition; this is immediately followed by movement of the screen or screens while in their lowermost position, away from the delivery end of the apparatus, during which interval the heavier particles begin to settle through the water; then the screen or screens move upwardly, again engaging the suspended particles, but at a location on the screen or screens, nearer their delivery ends than before, and furthermore, the suction effect of the water then flowing downwardly through the screen or screens, positively moves the small particles constituting the concentrates desired to be recovered, to and through the screen or screens, for delivery to suitable receptacles; then, further movement of the screen or screens while in their upper position, towards the delivery end of the apparatus carries the particles again engaged by the screen or screens, in the same direction, to be immediately thereafter by the next downward movement of the screen or screens, again left in suspension in the water. Suitable devices are provided at the delivery end of the apparatus, to raise the oversize particles remaining after successive treatments as described, from the water and remove the same from the apparatus.

My improved method and apparatus are particularly effective in separating small particles of gold and other precious metals, from the gangue or waste mineral material with which said particles are found in natural association.

My invention will be best understood by reference to the accompanying drawings, illustrating a preferred embodiment thereof, in which Fig. 1 is a longitudinal, vertical, sectional view through my apparatus, taken along the line 1—1 in Fig. 2, Fig. 2 is a plan view of my apparatus, Fig. 3 is a transverse, vertical, sectional view through my apparatus, taken along the line 3—3 in Fig. 1, Fig. 4 illustrates in front elevation to an enlarged scale, one of a first set of rakes employed to remove the oversize particles from the delivery end of the lower screen shown in Fig. 1, this view being taken along the line 4—4 in Fig. 1, Fig. 5 illustrates in a view similar to Fig. 4, one of a second set of rakes employed for the same purpose as the rake shown in Fig. 4, this view being taken along the line 5—5 in Fig. 1, Fig. 6 illustrates in a view similar to Fig. 4, one of a set of rakes employed to remove the oversize particles from the delivery end of the upper screen shown in Fig. 1, this view being taken along the line 6—6 in Fig. 1, Fig. 7 illustrates in horizontal, sectional view and to an enlarged scale, the construction of one of the cranks employed to support and operate the screens, this view being taken along the line 7—7 in Fig. 1, Fig. 8 is a horizontal, sectional view of the parts shown in Fig. 7, taken along the line 8—8, Fig. 9 is a vertical, sectional view of the parts shown in Fig. 8, taken along the line 9—9, and Fig. 10 is a sectional view to an enlarged scale, taken horizontally through the upper supporting shaft and the driving shaft of the endless conveyor illustrated in Figs. 1 and 2.

Similar numerals refer to similar parts throughout the several views.

As shown in Figs. 1, 2 and 3, my improved apparatus consists of a tank 10, provided with upwardly extending brackets 11, 11 carrying bearings 12, 12, supporting short shafts 13, 13, each of said shafts having rigidly secured to one of its ends, a bevel gear 14, and having rigidly secured to its other end a crank 15. Each crank 15 is provided with a crank pin 16 supporting a hanger 17 rigidly secured at its lower end to a screen box 18 open at its top and having upwardly extending inclined side walls 18a, 18a at its delivery end. The screen box 18 has extending across its bottom a first screen 19 supported by a screen frame 19a below which a spacer frame 20 is disposed. The frame 20 has extending across its bottom a second screen 21 supported by a screen frame 21a. The screen frame 21a, the spacer frame 20 and the screen frame 19a are secured to the lower portion of the screen box 18, by thumb screws 22 extending into the lower edge of said screen box.

As shown in Fig. 1, the right hand portion of the screen 19 extends up the inclined lower edges of the walls 18a, 18a, part way to the upper ends of the latter, and from the upper edge of the frame 19a of said screen, a plate 23 completes the bottom of said screen box to the upper, right hand end of the latter. The screen 21 similarly extends at its right hand portion, up the lower inclined edges of the spacer frame 20, parallel with the corresponding portion of the screen 19, part way to the upper, right hand end of said spacer frame, and from the upper edge of the frame 21a of said screen, a plate 24 completes the bottom of said spacer frame to the upper, right hand end of the latter, where said plate is bent downwardly, as indicated at 24a, to form a discharge chute for oversize particles delivered from above the screen 21. Below the plate 24, the upper edge of the adjacent wall of the tank 10 is inturned as shown at 10a, to prevent agitation of the water in the tank 10 causing flow of the water from the tank over the tank wall below the said spacer frame. The spacer frame 20 also carries at its upper end, a downwardly extending plate 25, extending at its upper edge under the downwardly turned upper edge of the plate 23, to form a discharge chute for oversize particles delivered from above the screen 19.

As shown in Fig. 2, the bevel gears 14, 14 mesh with similar bevel gears 26, 26 carried by and secured to side shafts 27, 27 supported by bearing brackets 12a extending from the bearings 12. The right hand ends of the shafts 27, 27 as shown in Fig. 2, are supported by bearing brackets 28a, 28a extending from bearings 28, 28 supported by brackets 29, 29, extending upwardly from the tank 10. The bearings 28, 28 support a cross shaft 30 having secured to its ends bevel gears 31, 31 meshing with similar bevel gears 32, 32 secured to the adjacent ends of the shafts 27, 27.

The left hand end of the upper shaft 27 as shown in Fig. 2, is extended beyond the tank 10 and supported by a bearing bracket 33 carried by said tank, which also supports one end of a short cross shaft 34, the other end of which is supported by a bearing bracket 35 also carried by the tank 10. The adjacent ends of the shafts 27 and 34 have respectively secured thereto intermeshing and similar bevel gears 36 and 37, and the lower end of the shaft 34 has secured thereto a crank 38 provided with a crank pin 39 engaging a link 40 over the mid-portion of the end of the tank 10, the other end of said link being pivotally connected with the upper end of a bracket 41 extending upwardly from and rigidly secured to the end of the screen box 18. A bracing member 42 connects the upper portion of the bracket 41 with the opposite hangers 17, 17 which are near said bracket 41.

The shaft 30 has secured thereto a pulley or wheel 43 by which the shafts 27, 27, 30 and 34 may be driven. The cranks 15, 15, and 38 are of the same construction and are secured to the shafts that carry them, in the same relation, each as the other, with the following results. The screen box 18 and the parts secured thereto, are supported in the tank 10 by the cranks 15, 15, and have imparted to them the same kind of movement as the movement of the crank pins 16, 16, that is to say, a circular movement, and at the same time, as a result of there being four of said supporting cranks, the left hand portions of the screens 19 and 21 are maintained in substantially horizontal position at all times. These supporting and moving connections will operate the screen box 18 and attached parts, satisfactorily and without undue strains, at slow speeds and where the load placed on the screens is light. To provide for more rapid operation and to handle effectively, relatively heavy loads on the screens, the crank 38, through the link 40, imparts horizontal moving forces directly to the screen box 18, greatly relieving the hangers 17, 17 and their connections of undesirable strains that would be set up under such conditions, were the crank and its connections, not employed.

The screen box 18 at its right hand portion as shown in Fig. 1, carries devices for moving oversize particles from above the screen 19 to and from the delivery chute 25, consisting of an endless belt 44 mounted on shafts 45 and 46, the latter of which, as more clearly shown in Fig. 10, has secured to one of its ends, a gear 47 meshing with a similar gear 48 supported on a short shaft 49, in turn supported by the screen box 18. The outer end of the short shaft 49 has secured thereto a crank 50 provided with a crank pin 51 (Fig. 2), engaging a bracket 52 rigidly secured to the tank 10. The belt 44 carries a plurality of rakes 53 for engaging and removing the oversize particles from above the screen 19. The crank 50 is preferably of the same construction as the cranks 15, 15, as a result of which, the circular movement of the screen box 18 above referred to, rotates the gears 47 and 48 and drives the belt 44 to move said oversize material as described.

As shown in Fig. 1, the right hand and upwardly inclined portion of the spacer frame 20, carries a first set of spaced rakes 54 pivotally connected with said spacer frame at 55 and provided with lugs 56 permitting turning movement of the rakes 54 towards the upper end of the spacer frame, and preventing turning movement of said rakes in the reverse direction, from their positions shown in Fig. 1. A reciprocable frame 57 is carried by the right hand portion of the spacer frame 20, and pivotally supports at 58, 58, a second set of spaced rakes 59 respectively located between the rakes 54 and engaging stop pins 60 carried by the frame 57, which stop pins permit turning movement of the rakes 59 towards the upper end of the spacer frame 20, and prevent turning movement of said rakes in the reverse direction, from their positions shown in Fig. 1. The frame 57 is connected with rods 61 extending through the plate 25, which rods are pivotally connected with links 62, the other ends of said links being pivotally connected with a cross bar 63 supported by extensions of the side walls of the tank 10. The rakes 54 thus move bodily with the spacer frame 20 and the screen box 18, when circular movement is imparted to the latter, whereas the connection of the rakes 59 with the bar 63 carried by the tank 10, prevents similar movement of the rakes 59, and causes a reciprocating movement of the rakes 59 between the rakes 54, for said circular movement of the screen box 18.

As shown in Fig. 6, each of the rakes 53 preferably consists of a frame carrying a flat screen 53a of a mesh substantially the same as the screen 19, so that the rakes 53 will move substantially all of the oversize material from the screen 19 to the delivery chute 25.

The construction and support of the rakes 59 and 54 respectively, is more clearly shown in Figs. 4 and 5, each of the rakes 59 preferably consisting of a frame carrying a flat screen 59a, and each of the rakes 54 preferably consisting of a frame carrying a flat screen 54a, the mesh of the screens 59a and 54a being preferably substantially the same as the mesh of the screen 21, so that the rakes 59 and 54 will move substantially all of the oversize material from the screen 21 to the delivery chute 24a.

The screens 19 and 21 are preferably provided respectively with pockets or traps 19b and 21b (Figs. 1 and 2), to engage and retain heavy oversize particles relatively to said screens respectively, particularly where mineral containing nuggets of precious metal, for example gold, is treated and concentrated by the apparatus.

In using the apparatus, the tank 10 is filled with water to a depth just below the edge 10a of the tank, as indicated by the water line 64 (Fig. 1), said water being conveniently supplied to said tank by a pipe 65 (Figs. 1 and 2), and said water level being maintained by a float 66 pivotally supported at 67 and operating a valve 68, to control water flow from said pipe into the tank. (Figs. 1 and 2). The water level 64 is preferably above the screen box 18 for the highest position of the latter, so that said screen box is completely submerged at all times. The material to be treated and concentrated, is fed to the screen box 18 and onto the head end of the screen 19, through a spout 69, as rapidly as it can be taken care of by the concentrating apparatus. The cranks 15, 15 and 38 are then rotated synchronously by the shafting and gearing described, in the directions indicated by the arrows in Fig. 1, and the resultant circular movement of the screen box, rotates the crank 50 and the gears 47 and 48, to move the belt 44 in the direction indicated by the arrow in Fig. 1, and at the same time effects reciprocating movement of the rakes 59 relatively to the rakes 54. Each circle of movement, or cycle of operation of the screen box 18, beginning, for example, with the screen box in its position nearest to the head end of the tank 10, first raises the screen 19 and the material delivered thereto by the spout 69, and moves said screen and material through the water in the tank, towards the tail end of the tank; then the screen 19 is moved downwardly in the water and at a rate to leave the material previously on the screen, in suspension and in divided condition in the water; with the material in suspended condition, the screen 19, which is now in relatively clean condition due to the upward movement of the water through it, moves through the bottom part of its travel and to its head end position in the tank, at which time the screen again engages the material previously upon it, but at a position nearer the tail end of the screen than before, and the screen is in a position to begin its next cycle of operation, each of its cycles of operation being the same as just described.

The material passing through the screen 19 onto the screen 21, as a result of the steps of treatment above described, consists of a mixture of particles of sizes small enough to pass through the screen 21 and particles that are too large to pass through the latter screen, and the cyclic movement above described which applies to the screen 21 as well as to the screen 19, acts upon the said mixture between said screens, first suspending the particles in the water, separating the particles, permitting gravity separation of the heavier particles from the lighter particles, and cleaning the screen 21, and then by upward movement of the latter screen, inducing flow of the water downwardly through the screen, the suction of which urges the smaller particles to and through the screen, all in the same manner that the material above the screen 19 is acted upon relatively to the screen 19, successive cycles of movement of the screen 21 alternately suspending and separating the particles in the water and advancing the particles held above the screen, towards the tail end thereof, the successive treatments of the material so effectively separating the particles of different sizes, that all of the particles smaller than the mesh of the screen 21, pass through said screen, and all of the particles of larger size and smaller than the mesh of the screen 19, are moved on the screen 21 towards the tail end of the latter for delivery from the chute 24a.

Similarly, the said successive treatments of the material above the screen 19, so effectively separates the particles of said material, that all of said particles of smaller size than the mesh of said screen pass through it, and only particles of larger size remain above said screen, for delivery from the chute 25.

In the manner described, my improved method effectively separates material particles into a plurality of classes as to size, or classifies said particles, and most thoroughly and efficiently separates all of the particles of any desired class or classes, from the rest of the material treated.

As shown in Fig. 3, the screen box 18 carries splash boards 70, 70, secured in place in any convenient manner, for example by screws as indicated, which splash boards may be placed at the sides and head end of the screen box, to prevent material being treated in the screen box, from flowing over the top of the screen box into the tank 10, by the agitation of the water in the tank resulting from the above described movement of the screen box and screens through the water. Sufficient clearance space is preferably provided at the ends of said splash boards, so that the water level above the screen 19 is not materially changed, by the movement of the screen box through the water. Said splash boards are omitted in Figs. 1 and 2, to more clearly show the construction of the apparatus.

The cranks 15, 38 and 50 are of the same construction, and are preferably provided with devices as illustrated in Figs. 7, 8 and 9 for one of the cranks 15, for changing the throw thereof to secure different amounts of agitation that may be required for different materials treated by the apparatus, it being understood that for any particular condition of operation, the cranks 15, 38 and 50 must be adjusted to have the same throw, each as the other, to avoid undue strains in said cranks and in the structure supported and operated thereby.

As shown in Figs. 7, 8 and 9, the crank 15 is provided with a longitudinal slot 15a in which a rectangular block 16a is mounted for sliding movement, said block having the crank pin 16 extending from it, and said pin being preferably integral with said block. The block is provided with an integral flange 16b overlapping the outer face of the crank and located between the crank and the hanger 17 supported by the pin 16, said flange preventing movement of said block from the slot 15a towards the gear 14, and at the same time providing a desirable mechanical clearance between the crank 15 and the hanger 17. The other end of the block 16a has secured thereto in any convenient manner, for example by screws as indicated, a plate 16c overlapping the face of the crank adjacent the bearing 12, and restraining movement of the block 16a in the slot 15a, away from the gear 14. A screw 71 is threaded through the end of the crank, and extends into the slot 15a, said screw having a T-shaped inner end 71a, engaging a correspondingly shaped groove 16d, extending from under the plate 16c into the block 16a. As a result, turning the screw 71, moves the block 16a and the pin 16 towards or from the shaft 13 as desired, and thus the crank may be given any desired throw. A lock nut 72 is provided on the screw 71 for clamping engagement against the end of the crank 15, to lock said screw against turning movement, thus maintaining any desired adjustment of the pin 16 in the crank 15.

As shown in Figs. 1 and 3, the lower portions of the side walls of the tank 10 converge towards an outlet opening from which a pipe 72 extends, to draw from the lower portion of the tank, the particles passed through the screen 21, said pipe being provided with a valve 73 to control flow therethrough, and permit the accumulation of the classified small size particles, or concentrates, in the tank, as desired.

It will be understood that the apparatus described is illustrative of but one embodiment of my invention, and that any other construction may be employed, as desired, that will effect the described treatment of the material, without departing from the scope of my invention; also, that my method of treatment, broadly, consists of moving the classifying means in any manner and by any means that will be downward movement of the classifying means in the water, effect the suspension and separation of the material particles in the water and permit gravity to differentially act on said particles, and preferably at the same time cleaning the classifying means by its movement in the water, and that will by upward movement of the classifying means in the water, again engage the material particles and utilize the suction effect of the water through the classifying means in separating the under size particles from the oversize particles, combined with horizontal movement of the classifying means through the water, to move the material on the classifying means, step by step, from the head end of said classifying means to its tail end. It will be understood that my method of treatment is realized, by any closed path of movement of the classifying means in the water, as long as said path of movement, representing one cycle of operation, has successive component parts including in the order named, downward movement, horizontal movement towards the head end of the apparatus, upward movement, and horizontal movement away from the head end of the apparatus.

It will be observed that in using my apparatus, the traps 19b and 21b in the screens 19 and 21, hold the nuggets of precious metal, for example, nuggets of gold, that are oversize relatively to said screens respectively, throughout the cyclic operation of said screens under water as above described, due to said nuggets being heavier than the corresponding oversize particles of mineral; in this manner, each screen and its nugget traps, effect a separation of the nuggets from the other particles of mineral that are oversize as to that screen, by holding the heavy nuggets in said traps during their movement through the water, whereas the lighter oversize particles of mineral or rock, are suspended in the water and again engaged by the screen nearer the delivery end thereof, by each cycle of movement of the screen in the water, for delivery from the screen as described.

Where in the specification and claims I refer to the screen or screens as being horizontal, it will be understood that I include within the meaning of that term, any departure from an exactly horizontal position, that will effect the treatment and movement of the mineral particles above described, and that any such operative position of the screen may be regarded as substantially horizontal, since the screen will not operate effectively as described, if the screen is inclined a considerable amount to a horizontal plane.

I do not limit my self therefore, in carrying out my invention, to the particular construction or to the particular steps of treatment described, as I may employ equivalents thereof, known to the art at the time of filing this application, without departing from the scope of the appended claims.

What I claim is:

1. Concentrating and classifying apparatus consisting of the combination of a tank, a screen disposed in horizontal position in said tank, means for delivering mineral particles onto said screen for treatment, first cranks supporting said screen, first shafts supporting said cranks, devices connecting said shafts for synchronous rotation, whereby rotation of said shafts rotates said cranks and imparts circular movement in a vertical plane to each part of said screen and maintains said screen in substantially horizontal position at all times, mechanism for supplying water to said tank and for maintaining a water level therein above said screen for the highest position of the latter, and means movable bodily with said screen and having a second movement for raising remaining oversize particles from said screen through the water in said tank and for delivering said oversize particles from said tank, said raising and delivering means comprising an endless belt, second shafts supporting said belt, a first gear connected with one of said second shafts, a second gear meshing with said first gear, a second crank secured to said second gear, and a fixed bearing engaging the crank pin of said second crank.

2. Concentrating and classifying apparatus consisting of the combination of a tank, a screen substantially flat throughout and supported in a horizontal plane in said tank, devices for moving said screen repeatedly along an endless circuit in a vertical plane, mechanism for supplying water to said tank and maintaining a water level therein above said screen for the highest position of the latter, said screen having a downwardly extending pocket of small extent relatively to the size of the screen constituting a trap of screen material for receiving oversize nuggets of precious metal and holding said nuggets throughout said movement of said screen, and means for removing from said tank lighter oversize material from said screen.

3. Concentrating and classifying apparatus consisting of the combination of a tank, a substantially flat screen supported horizontally in the tank, and means for moving the screen in the tank, said screen having a downwardly extending pocket of small extent relatively to the size of the screen constituting a trap of screen material for receiving oversize nuggets of precious metal and holding said nuggets throughout movement of said screen.

4. Concentrating and classifying apparatus consisting of the combination of a tank for holding water, two superposed screens mounted horizontally for cyclic movement in water in said tank, said screens having closely spaced delivery portions extending upwardly towards the discharge end of the tank, and removing means for oversize material on the lower one of said screens, said removing means being contained between said delivery portions and having reciprocating movement relatively to the lower one of said delivery portions.

5. Concentrating and classifying apparatus consisting of the combination of a tank for holding water, two superposed screens mounted horizontally for cyclic movement in water in said tank, said screens having closely spaced delivery portions extending upwardly towards the discharge end of the tank, and removing means for oversize material on the lower one of said screens, said removing means comprising side bars mounted between said delivery portions for reciprocating movement longitudinally of the lower one of said delivery portions, and rakes pivotally supported by said side bars for moving material upwardly on said lower delivery portion.

CHARLES B. ULRICH.